(12) United States Patent
Jin

(10) Patent No.: US 10,660,476 B2
(45) Date of Patent: May 26, 2020

(54) BEVEL PLANETARY GEAR MECHANISM APPLIED TO STAND MIXER

(71) Applicant: Xueshi Jin, Guiyang (CN)

(72) Inventor: Xueshi Jin, Guiyang (CN)

(*) Notice: Subject to any disclaimer, the term of this patent is extended or adjusted under 35 U.S.C. 154(b) by 0 days.

(21) Appl. No.: 16/432,374

(22) Filed: Jun. 5, 2019

(65) Prior Publication Data

US 2019/0282035 A1 Sep. 19, 2019

Related U.S. Application Data

(63) Continuation of application No. PCT/CN2017/000543, filed on Aug. 30, 2017.

(51) Int. Cl.
| | |
|---|---|
| A47J 43/08 | (2006.01) |
| A21C 1/02 | (2006.01) |
| A21C 1/14 | (2006.01) |
| F16H 1/28 | (2006.01) |
| B01F 7/16 | (2006.01) |
| B01F 7/00 | (2006.01) |
| A21C 1/04 | (2006.01) |
| B01F 7/30 | (2006.01) |

(52) U.S. Cl.
CPC ............... *A47J 43/082* (2013.01); *A21C 1/02* (2013.01); *A21C 1/04* (2013.01); *A21C 1/147* (2013.01); *B01F 7/00275* (2013.01); *B01F 7/1615* (2013.01); *B01F 7/30* (2013.01); *F16H 1/28* (2013.01); *F16H 1/2854* (2013.01)

(58) Field of Classification Search
CPC .................................................... A47J 43/082
USPC ................................................. 366/287, 288
See application file for complete search history.

(56) References Cited

U.S. PATENT DOCUMENTS

| | | | | |
|---|---|---|---|---|
| 370,335 A | * | 9/1887 | Hunter ...................... | B01F 7/30 366/288 |
| 374,706 A | * | 12/1887 | Rosenkranz .............. | B01F 7/30 366/288 |

(Continued)

FOREIGN PATENT DOCUMENTS

| | | |
|---|---|---|
| CN | 2662804 Y | 12/2004 |
| CN | 202355273 U | 8/2012 |

(Continued)

OTHER PUBLICATIONS

Internation Search Report of PCT/CN2017/000543, dated Nov. 23, 2017.

*Primary Examiner* — David L Sorkin
(74) *Attorney, Agent, or Firm* — Erson IP (Nelson IP)

(57) ABSTRACT

The disclosure discloses a bevel planetary gear mechanism applied to a stand mixer, including a center bevel gear (2), a first bevel planetary gear (10), a second bevel planetary gear (3), a third bevel planetary gear (4), an internal bevel gear (5) and a bevel planetary gear bracket (11), wherein, the center bevel gear (2) is mounted on a spindle (1); the first bevel planetary gear (10), the second bevel planetary gear (3) and the third bevel planetary gear (4) are all engaged with the center bevel gear (2); the internal bevel gear (5) surrounds the first bevel planetary gear (10), the second bevel planetary gear (3) and the third bevel planetary gear (4) and are engaged with such three gears. By using the bevel planetary gear mechanism provided by the disclosure, the stand mixer has a pitched kneading hook, thereby improving the kneading effect of the stand mixer.

5 Claims, 4 Drawing Sheets

(56) References Cited

U.S. PATENT DOCUMENTS

| | | | | |
|---|---|---|---|---|
| 1,443,926 A | * | 1/1923 | Postranecky | B02C 15/14 |
| | | | | 241/125 |
| 1,475,978 A | * | 12/1923 | Westerman | A21C 1/02 |
| | | | | 366/287 |
| 1,762,081 A | * | 6/1930 | Schleicher | A47J 43/044 |
| | | | | 366/288 |
| 4,131,034 A | * | 12/1978 | Rolf | A47J 43/044 |
| | | | | 366/288 |
| 7,318,375 B2 | | 1/2008 | Huang | |
| 2004/0159727 A1 | | 8/2004 | Mueller | |
| 2019/0090695 A1 | | 3/2019 | Jays et al. | |

FOREIGN PATENT DOCUMENTS

| | | |
|---|---|---|
| CN | 203539161 U | 4/2014 |
| CN | 206398016 U | 8/2017 |
| DE | 2942004 A1 | 5/1981 |
| EP | 1967105 A1 | 9/2008 |
| WO | 2011144820 A1 | 11/2011 |

* cited by examiner

BEVEL PLANETARY GEAR MECHANISM APPLIED TO STAND MIXER

CROSS-REFERENCE TO RELATED APPLICATIONS

This application is a continuation of International Patent Application No. PCT/CN2017/000543 with a filing date of Aug. 30, 2017, designating the United States, and further claims priority to Chinese Patent Application No. 201720054593.9 with a filing date of Jan. 18, 2017. The content of the aforementioned applications, including any intervening amendments thereto, are incorporated herein by reference.

TECHNICAL FIELD

The disclosure relates to the technical field of cooking utensil devices, and particularly relates to a bevel planetary gear mechanism applied to a stand mixer.

BACKGROUND OF THE PRESENT INVENTION

A stand mixer is a multifunctional kitchen electric appliance mainly capable of kneading, whipping eggs and stirring in the field of Chinese and western pastry. For commercially available stand mixers, a stirring force is mainly delivered by driving a gear via a belt. The machine body is made of metal and plastic, the metal including a cast aluminum machine body and an aluminum alloy material, and plastic being generally ABS engineering plastic. Glass fiber is also added to some machine body materials to enhance the toughness and, durability of the machine.

At present, a kneading hook of a stand mixer on the market makes a planar planetary motion trail, namely, the kneading hook is vertically mounted. The stand mixer manufactured by this mounting manner has an ordinary effect when kneading, does not obtain a good kneading effect in many cases, and therefore cannot satisfy the needs of chefs and cannot achieve omnibearing and sufficient mixed kneading.

SUMMARY OF PRESENT INVENTION

The technical problem to be solved by the disclosure is that aiming at the current situation of the prior art, a bevel planetary gear mechanism applied to a stand mixer is provided, so that the stand mixer can have a pitched kneading hook, thereby improving the kneading effect of the stand mixer.

The technical solution to solve the above technical problem adopted by the disclosure is as follows: provided is a bevel planetary gear mechanism applied to a stand mixer, including a spindle, a bevel planetary gear mechanism and a kneading hook, wherein, the bevel planetary gear mechanism includes a center bevel gear, a first bevel planetary gear, a second bevel planetary gear, a third bevel planetary gear, an internal bevel gear and a bevel planetary gear bracket;

wherein the center bevel gear is mounted on the spindle, and the end of the spindle extends downwardly to the inside of the bevel planetary gear bracket positioned at the lower side of the center bevel gear; the first bevel planetary gear, the second bevel planetary gear and the third bevel planetary gear are rotatablely mounted on the bevel planetary gear bracket, and the first bevel planetary gear, the second bevel planetary gear and the third bevel planetary gear are all engaged with the center bevel gear; the internal bevel gear surrounds the first bevel planetary gear, the second bevel planetary gear and the third bevel planetary gear and are engaged with such three gears; a stirring shaft penetrates through the inside of the first bevel planetary gear and rotates together with the first bevel planetary gear, and the inside of the first bevel planetary gear is fixed relative to the stirring shaft through a spring positioned on the top of the inside of the first bevel planetary gear and a clamp spring positioned under the first bevel planetary gear; one end of the kneading hook extends into the inside of the stirring shaft, and steel balls are provided between the top of the inner side of the stirring shaft and one end of the kneading hook.

As a further embodiment of the disclosure, the other end of the kneading hook is of a "bow" shape.

As a further embodiment of the disclosure, the stirring shaft is fixed relative to the first bevel planetary gear and rotates with the rotation of the first bevel planetary gear.

As a further embodiment of the disclosure, a bearing is provided at a connection between the spindle and the bevel planetary gear bracket.

As a further embodiment of the disclosure, the center bevel gear is mounted on the spindle through a square hole.

Compared with the prior art, the disclosure can achieve omnibearing and sufficient mixed kneading, wherein, the spindle drives the center bevel gear to rotate; the first bevel planetary gear, the second bevel planetary gear and the third bevel planetary gear are assembled on the bevel planetary gear bracket; the center bevel gear drives the first bevel planetary gear, the second bevel planetary gear and the third bevel planetary gear to rotate in the internal bevel gear; the stirring shaft is mounted in the first bevel planetary gear, the kneading hook is inserted into the stirring shaft, and the spring and the steel balls are used for positioning the kneading hook; the kneading hook rotates in the first bevel planetary gear, and meanwhile, revolves in the internal bevel gear, so as to complete planetary motion trail. By using the above method, the manufactured kneading hook is better in kneading effect, and satisfies the pursue of the chefs on the kneading effect.

Figure 1:
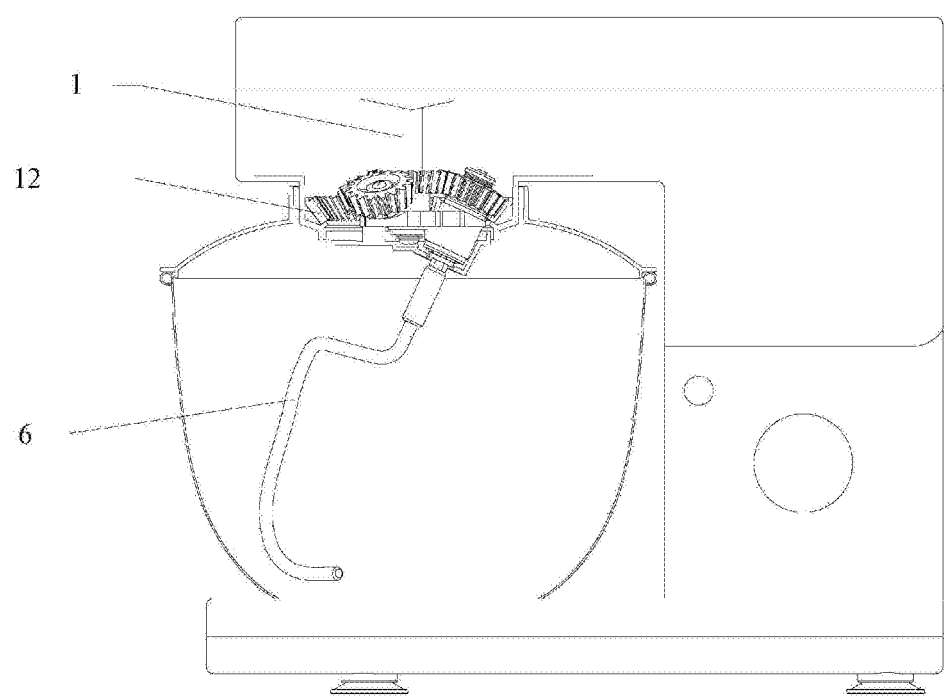
FIG. 1 is a structural diagram of a bevel planetary gear mechanism applied to a stand mixer according to an embodiment of the disclosure.

In the drawings: 1-spindle, 2-center bevel gear, 3-second bevel planetary gear, 4-third bevel planetary gear, 5-internal bevel gear, 6-kneading hook, 7-spring, 8-steel ball, 9-clamp spring, 10-first bevel planetary gear, 11-bevel planetary gear bracket, 12-bevel planetary gear mechanism, 13-stirring shaft, and 14-stirring bearing.

DETAILED DESCRIPTION OF PREFERRED EMBODIMENTS

The disclosure will be described in detail in combination with drawing embodiments below.

Figure 2:
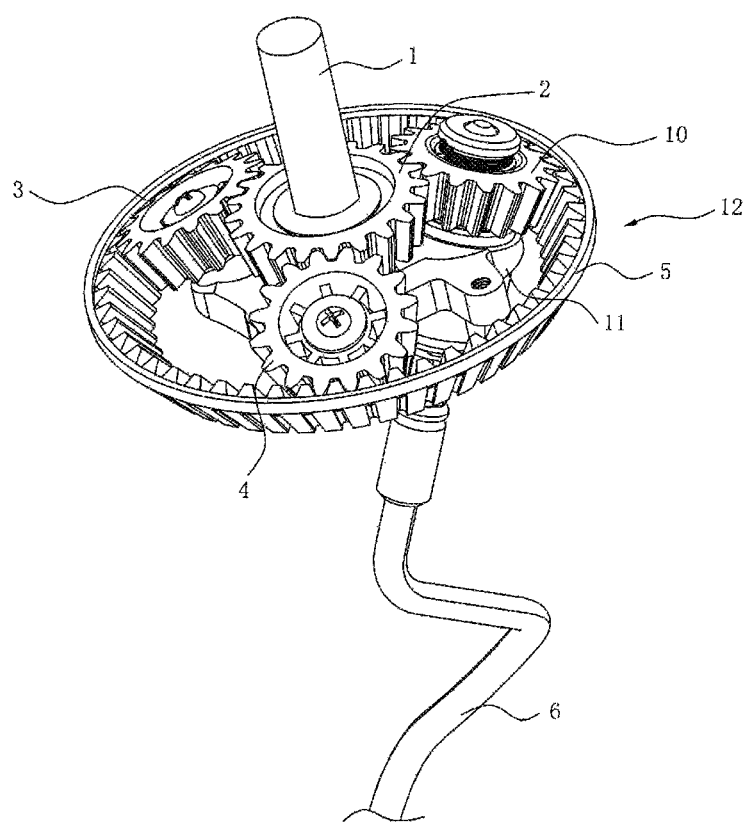
FIG. 2 is a structural diagram of a bevel planetary gear mechanism applied to a stand mixer according to an embodiment of the disclosure.
Figure 3:
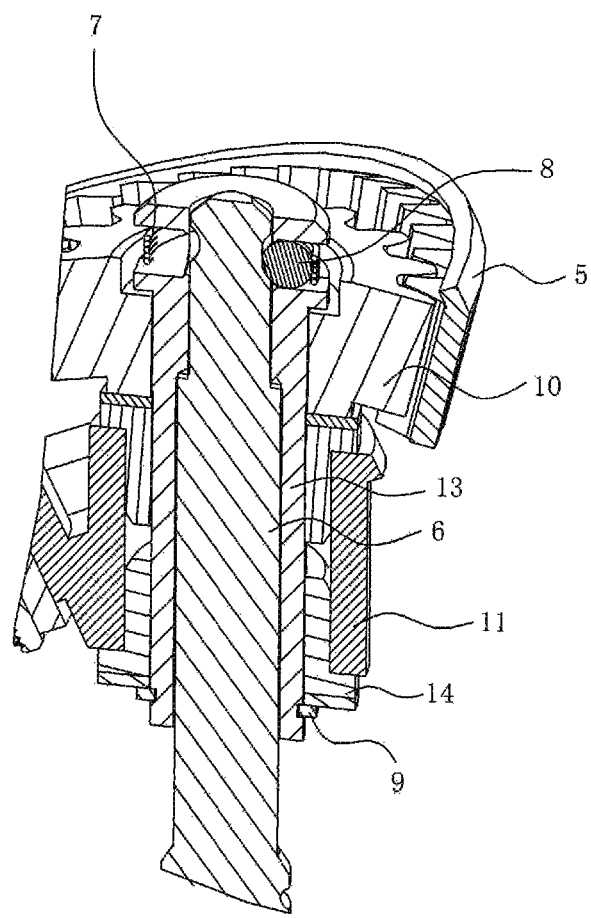
FIG. 3 is a cross-sectional view of a first bevel planetary gear, a stirring shaft, a kneading hook, a spring and steel balls in an embodiment of the disclosure.
Figure 4:
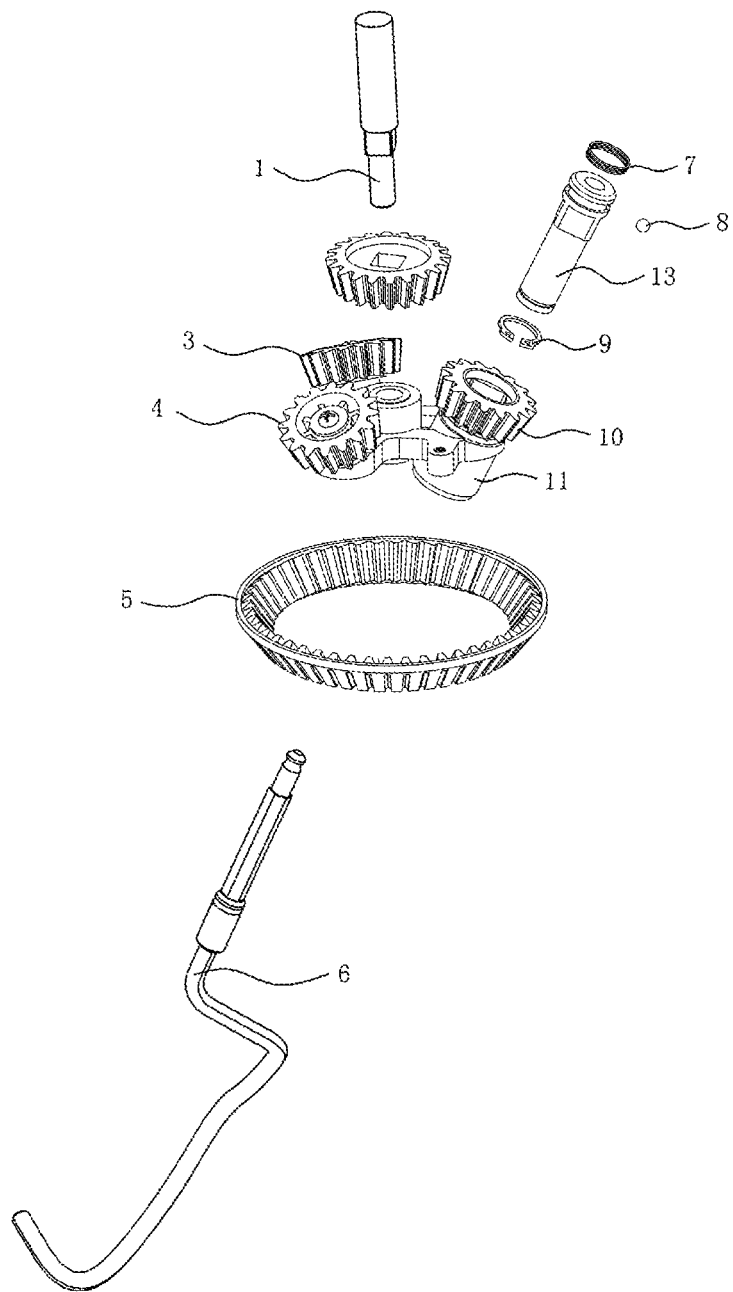
FIG. 4 is an exploded perspective view of a bevel planetary gear mechanism applied to a stand mixer according to an embodiment of the disclosure.

As shown in FIGS. 1~4, FIGS. 1~4 illustrate an embodiment of a bevel planetary gear mechanism applied to a stand mixer of the disclosure. The bevel planetary mechanism includes a spindle 1, a bevel planetary gear mechanism 12 and a kneading hook 6.

The bevel planetary gear mechanism 12 includes a center bevel gear 2, a first bevel planetary gear 10, a second bevel planetary gear 3, a third bevel planetary gear 4, an internal bevel gear 5 and a bevel planetary gear bracket 11;

wherein, the center bevel gear 2 is mounted on a spindle 1 via a square hole formed in the center of the center bevel gear 2, and is in transmission connection with the spindle 1;

the bevel planetary gear bracket 11 is fixed relative to the spindle 1 and positioned under the center bevel gear 2, the end of the spindle 1 extends downwardly to the inside of the bevel planetary gear bracket 11, and the spindle 1 can rotate relative to the bevel planetary gear bracket 11;

the first bevel planetary gear 10, the second bevel planetary gear 3 and the third bevel planetary gear 4 are rotatablely mounted on the bevel planetary gear bracket 11 and uniformly distributed around the center bevel gear 2, three of them are all engaged with the center bevel gear 2, and the first bevel planetary gear 10, the second bevel planetary gear 3 and the third bevel planetary gear 4 can synchronously rotate following the center bevel gear 2;

the internal bevel gear 5 surrounds the first bevel planetary gear 10, the second bevel planetary gear 3 and the third bevel planetary gear 4 and are engaged with such three gears;

a stirring shaft 13 penetrates through the inside of the first bevel planetary gear 10 and the bevel planetary gear bracket 11, and rotates together with the first bevel planetary gear 10, the cross section of the stirring shaft 13 is integrally of a T shape, the head of the stirring shaft is clamped on the top of the first bevel planetary gear 10, a clamp spring 9 is clamped at the periphery of the bottom of the stirring shaft 13, a stirring bearing 14 is provided between the inner side of the bevel planetary gear bracket 11 and the stirring shaft 13, and the stirring shaft 13 is positioned relative to the stirring bearing 14 and the bevel planetary gear bracket 11 through the clamp spring 9; and one end of the kneading hook 6 extends into the inside of the stirring shaft 13 and rotates following the stirring shaft 13, a circle of groove is formed at the periphery of the upper part of the stirring shaft 13, a spring 7 and steel balls 8 are built in the groove, the spring 7 coats the steel balls 8 so as to position the steel balls 8 between one end of the kneading hook 6 and the inner side of the spring 7, such that one end of the kneading hook 6 is in reliable transmission connection with the stirring shaft 13.

The other end of the kneading hook 6 is of a "bow" shape.

The stirring shaft 13 is fixed relative to the first bevel planetary gear 10 and rotates with the rotation of the first bevel planetary gear 10.

A bearing is provided at a connection between the spindle 1 and the bevel planetary gear bracket 11.

The disclosure can achieve omnibearing and sufficient mixed kneading, wherein, the spindle drives the center bevel gear 2 to rotate; the first bevel planetary gear 10, the second bevel planetary gear 3 and the third bevel planetary gear 4 are assembled on the bevel planetary gear bracket 11; the center bevel gear 2 drives the first bevel planetary gear 10, the second bevel planetary gear 3 and the third bevel planetary gear 4 to rotate in the internal bevel gear 5; the stirring shaft 13 is mounted in the first bevel planetary gear 10, the kneading hook 6 is inserted into the stirring shaft 13, and the spring 7 and the steel balls 8 are used for positioning the kneading hook 6; the kneading hook 6 rotates in the first bevel planetary gear 10, and meanwhile, revolves in the internal bevel gear 5, so as to complete planetary motion trail. By using the above method, the manufactured kneading hook is better in kneading effect, and satisfies the pursue of the chefs on kneading effect.

For those skilled in the art, apparently, the disclosure is not limited to the details of the above exemplary embodiment, and can be achieved in other specific forms without departing from the spirit or basic features of the disclosure. Hence, from no matter which views, the embodiment should be considered as being exemplary and non-limiting. The scope of the disclosure is defined by appended claims rather than the above description, and thus it is intended that all variations falling within the meaning and scope of equivalents of claims are all included in the disclosure. Any reference numbers in claims should not be deemed as limiting the involved claims.

In addition, it should be understood that although the present specification is described according to embodiments, but not every embodiment only contains one independent technical solution, the narrative mode of the specification is only for the sake of clarity, those skilled in the art should use the specification as an entirety, and the technical solutions in various embodiments can also be properly combined to form other embodiments understood by those skilled in the art.

I claim:

1. A bevel planetary gear mechanism applied to a stand mixer, comprising: a spindle (1), a bevel planetary gear mechanism (12) and a kneading hook (6), wherein, the bevel planetary gear mechanism (12) comprises a center bevel gear (2), a first bevel planetary gear (10), a second bevel planetary gear (3), a third bevel planetary gear (4), an internal bevel gear (5) and a bevel planetary gear bracket (11);

wherein, the center bevel gear (2) is mounted on the spindle (1), and the end of the spindle (1) extends downwardly to the inside of the bevel planetary gear bracket (11) positioned at the lower side of the center bevel gear (2);

the first bevel planetary gear (10), the second bevel planetary gear (3) and the third bevel planetary gear (4) are rotatablely mounted on the bevel planetary gear bracket (11), and the first bevel planetary gear (10), the second bevel planetary gear (3) and the third bevel planetary gear (4) are all engaged with the center bevel gear (2);

the internal bevel gear (5) surrounds the first bevel planetary gear (10), the second bevel planetary gear (3) and the third bevel planetary gear (4) and are engaged with such three gears;

a stirring shaft (13) penetrates through the inside of the first bevel planetary gear (10) and rotates together with the first bevel planetary gear (10), and the inside of the first bevel planetary gear (10) is fixed relative to the stirring shaft (13) through a spring (7) positioned on the top of the inside of the first bevel planetary gear (10) and a clamp spring (9) positioned under the first bevel planetary gear (10);

one end of the kneading hook (6) extends into the inside of the stirring shaft (13), and steel balls are provided between the top of the inner side of the stirring shaft (13) and one end of the kneading hook (6).

2. The bevel planetary gear mechanism applied to a stand mixer according to claim 1, wherein, the other end of the kneading hook (6) is of a "bow" shape.

3. The bevel planetary gear mechanism applied to a stand mixer according to claim 1, wherein, the stirring shaft (13) is fixed relative to the first bevel planetary gear (10) and rotates with the rotation of the first bevel planetary gear (10).

4. The bevel planetary gear mechanism applied to a stand mixer according to claim 1, wherein, a bearing is provided at a connection between the spindle (1) and the bevel planetary gear bracket (11).

5. The bevel planetary gear mechanism applied to a stand mixer according to claim 1, wherein, the center bevel gear (2) is mounted on the spindle (1) through a square hole.

\* \* \* \* \*